United States Patent
Berard

(10) Patent No.: US 8,596,579 B2
(45) Date of Patent: Dec. 3, 2013

(54) PROCEDURE AND DEVICE FOR OPTIMIZING THE QUANTITY OF FUEL TRANSFERRED ON AN AIRCRAFT DURING AT LEAST ONE IN-FLIGH FUEL TRANSFER

(75) Inventor: Jeremy Berard, Fenouillet (FR)

(73) Assignee: Airbus Operations SAS, Toulouse ( * ) Notice: Subject to any disclaimer, the term of this patent is extended or adjusted under 35 U.S.C. 154(b) by 1158 days.

(21) Appl. No.: 10/967,127

(22) Filed: Oct. 19, 2004

(65) Prior Publication Data

US 2005/0116109 A1 Jun. 2, 2005

(30) Foreign Application Priority Data

Oct. 20, 2003 (FR) ...................................... 03 12232

(51) Int. Cl.
*B64D 39/00* (2006.01)
(52) U.S. Cl.
USPC ..................................................... 244/135 A
(58) Field of Classification Search
USPC .................. 244/135 A, 135 R, 194; 701/2–5
See application file for complete search history.

(56) References Cited

U.S. PATENT DOCUMENTS

| | | | | |
|---|---|---|---|---|
| 3,691,356 A | * | 9/1972 | Miller | 701/15 |
| 4,809,174 A | * | 2/1989 | Momenthy | 701/3 |
| 5,398,186 A | * | 3/1995 | Nakhla | 701/16 |
| 5,499,784 A | * | 3/1996 | Crabere et al. | 244/135 A |
| 5,606,505 A | * | 2/1997 | Smith et al. | 701/99 |
| 6,553,333 B1 | * | 4/2003 | Shenk | 702/182 |

* cited by examiner

*Primary Examiner* — Tien Dinh
(74) *Attorney, Agent, or Firm* — Dickinson Wright PLLC

(57) ABSTRACT

A procedure and device optimize the quantity of fuel transferred on an aircraft during at least one in-flight fuel transfer. The optimization device includes a section that makes a prediction to determine a first quantity corresponding to the quantity of fuel remaining on board the aircraft at a first flight point in the flight plan of the aircraft, taking into account the current status of the aircraft and the current flying conditions. The device further includes a section that makes an estimation to determine a second quantity corresponding to the quantity of fuel enabling the aircraft to fly from the first flight point to a second flight point later in the flight plan. The device further includes a section that determines, from the first and second quantities, a third quantity corresponding to the quantity of fuel to be transferred at the first flight point. The device further includes a display that presents the third duly determined quantity to at least one pilot of the aircraft.

7 Claims, 2 Drawing Sheets

PROCEDURE AND DEVICE FOR OPTIMIZING THE QUANTITY OF FUEL TRANSFERRED ON AN AIRCRAFT DURING AT LEAST ONE IN-FLIGH FUEL TRANSFER

FIELD OF THE INVENTION

The present invention relates to a procedure and a device for optimizing the quantity of fuel transferred on an aircraft during at least one in-flight transfer of fuel between said aircraft and an auxiliary aircraft.

BACKGROUND OF THE RELATED ART

It is known that modern aircraft have a flight management system that provides a flight plan made up of interlinked check points (or flight points). At each flight point, as far as the destination airport, the flight management system provides predictions: time of passage, speed, altitude, and fuel remaining on board.

However, during a flight, an in-flight transfer of fuel (or refueling) can vary the quantity of fuel on board the aircraft (other than by normal fuel consumption):
  either in the form of a decrease in the fuel on board, during in-flight refueling in the case of a refueling aircraft;
  or in the form of an increase in the fuel on board, during in-flight refueling in the case of a refueled aircraft.

SUMMARY OF THE INVENTION

An object of the present invention is to assist the crew in such an in-flight transfer or refueling. More specifically, an object is to indicate to the crew of an aircraft participating in an in-flight refueling:
  the maximum quantity of fuel that the aircraft can deliver, while retaining enough fuel to finish the flight, in the case of a refueling aircraft; or
  the minimum quantity of fuel that the aircraft must receive, to be able to complete its mission (and finish the planned flight), in the case of a refueled aircraft.

Normally, the quantity of fuel to be transferred is defined on the ground in preparing for the mission. In point of fact, such a quantity of fuel is obviously variable, in particular according to the flying conditions encountered by the aircraft up to the refueling point. Thus, the usual methods are unable to state an optimized and updated quantity of fuel.

An object of the present invention is to overcome these drawbacks. It relates to a procedure for optimizing the quantity of fuel transferred on an aircraft (that is, from or to the aircraft) during at least one in-flight transfer of fuel between said aircraft and an auxiliary aircraft, at least at a first flight point of the flight plan of said aircraft.

To this end, according to the invention, said procedure is noteworthy in that, during the flight of the aircraft according to said flight plan:
a) a prediction is made to determine a first quantity corresponding to the quantity of fuel remaining on board the aircraft at said first flight point, taking into account the current status of the aircraft and the current flying conditions;
b) an estimation is made to determine a second quantity corresponding to the quantity of fuel enabling the aircraft to fly from said first flight point to a second flight point later in said flight plan;
c) from said first and second quantities, a third quantity is determined, corresponding to the quantity of fuel to be transferred at said first flight point; and
d) said third quantity, duly determined, is presented to at least one pilot of the aircraft.

Thus, by virtue of the invention, the pilot is presented with a quantity of fuel to be transferred that is optimized, since it depends on the current status (speed, mass, altitude, etc.) of the aircraft and the current flying conditions (actual wind, temperature, etc.).

This quantity of fuel to be presented can furthermore be updated at any time. For this, according to the invention, said sequence of successive steps a) to d) is performed repetitively during the flight of the aircraft, each time taking into account, in step a), the current status of the aircraft and the current flying conditions, that is, the status and the flying conditions existing at the time of application of said steps a) to d).

Furthermore, advantageously, to make said estimation in step b), an auxiliary prediction is applied to determine a fifth quantity corresponding to the quantity of fuel remaining on board the aircraft at said second flight point, dependent on a fourth quantity corresponding to the quantity of fuel available on board the aircraft at said first flight point, and said fourth quantity is modified iteratively, for said auxiliary prediction, until a fifth quantity of fuel is obtained, which is zero, the fourth corresponding quantity then representing said second quantity sought (that is, the quantity of fuel enabling said aircraft to fly from said first flight point to said second flight point).

In the context of the present invention, said second flight point can represent:
  either the destination of the aircraft, that is, the final flight point in its flight plan;
  or any flight point between said first flight point, at which a transfer is made, and the final flight point in the flight plan.

In a first particular embodiment, said aircraft is a refueled aircraft, and said auxiliary aircraft is therefore a refueling aircraft.

In this case, advantageously, in step c), said first and second quantities are compared, and said third quantity is determined, corresponding to the quantity of fuel to be transferred at said first flight point, according to this comparison, such that:
  said third quantity is zero when said first quantity is greater than or equal to said second quantity, that is, when sufficient fuel is available on board the aircraft at said first flight point for it to reach said second flight point; and
  said third quantity is equal to the difference between said second quantity and said first quantity when said first quantity is less than said second quantity, said third quantity then corresponding to the minimum quantity of fuel needing to be received on board the aircraft at said first flight point for it to be able to reach said second flight point.

In addition, advantageously, in a plurality of fuel transfers (during a flight of the refueled aircraft), said steps a) to d) are applied to determine and to present, for each flight point at which a transfer is made, the minimum quantity of fuel that the aircraft must receive to reach the next flight point at which a transfer is also made or, where appropriate, the destination.

In a second particular embodiment, said aircraft is a refueling aircraft, and said auxiliary aircraft is therefore a refueled aircraft.

In this case, advantageously, in step c), said first and second quantities are compared, and said third quantity is determined, corresponding to the quantity of fuel to be transferred at said first flight point, according to this comparison, such that:

said third quantity is zero when said second quantity is greater than said first quantity, that is, when the refueling aircraft does not have sufficient fuel to reach said second flight point; and said third quantity is equal to the difference between said first quantity and said second quantity when said second quantity is less than or equal to said first quantity, said third quantity then corresponding to the maximum quantity of fuel that it is possible for the refueling aircraft to deliver at said first flight point, while still enabling said aircraft to reach said second flight point.

Furthermore, advantageously, in a plurality of fuel transfers (during a flight of the refueling aircraft), said steps a) to d) are applied to determine and to present, for at least the flight point at which a first transfer is made, the maximum quantity of fuel that the aircraft is able to deliver while being capable of reaching the destination, this being either by disregarding the other transfers, or by deducing the predetermined fuel quantities that are scheduled to be transferred at said other transfers.

The present invention also concerns a device for optimizing the quantity of fuel transferred on an aircraft during at least one in-flight transfer of fuel between said aircraft and an auxiliary aircraft, at a first flight point in the flight plan of said aircraft.

According to the invention, said device is noteworthy in that it comprises:

a means for making a prediction to determine a first quantity corresponding to the quantity of fuel remaining on board the aircraft at said first flight point, taking into account the current status of the aircraft and the current flying conditions;

a means for making an estimation to determine a second quantity corresponding to the quantity of fuel enabling the aircraft to fly from said first flight point to a second flight point later in said flight plan;

a means for determining, from said first and second quantities, a third quantity corresponding to the quantity of fuel to be transferred at said first flight point; and means of display for presenting said third duly determined quantity to at least one pilot of the aircraft.

BRIEF DESCRIPTION OF THE DRAWINGS

The figures in the appended drawing make it clear how the invention can be implemented. In these figures, identical references denote similar elements.

DETAILED DESCRIPTION OF THE INVENTION

Figure 1:
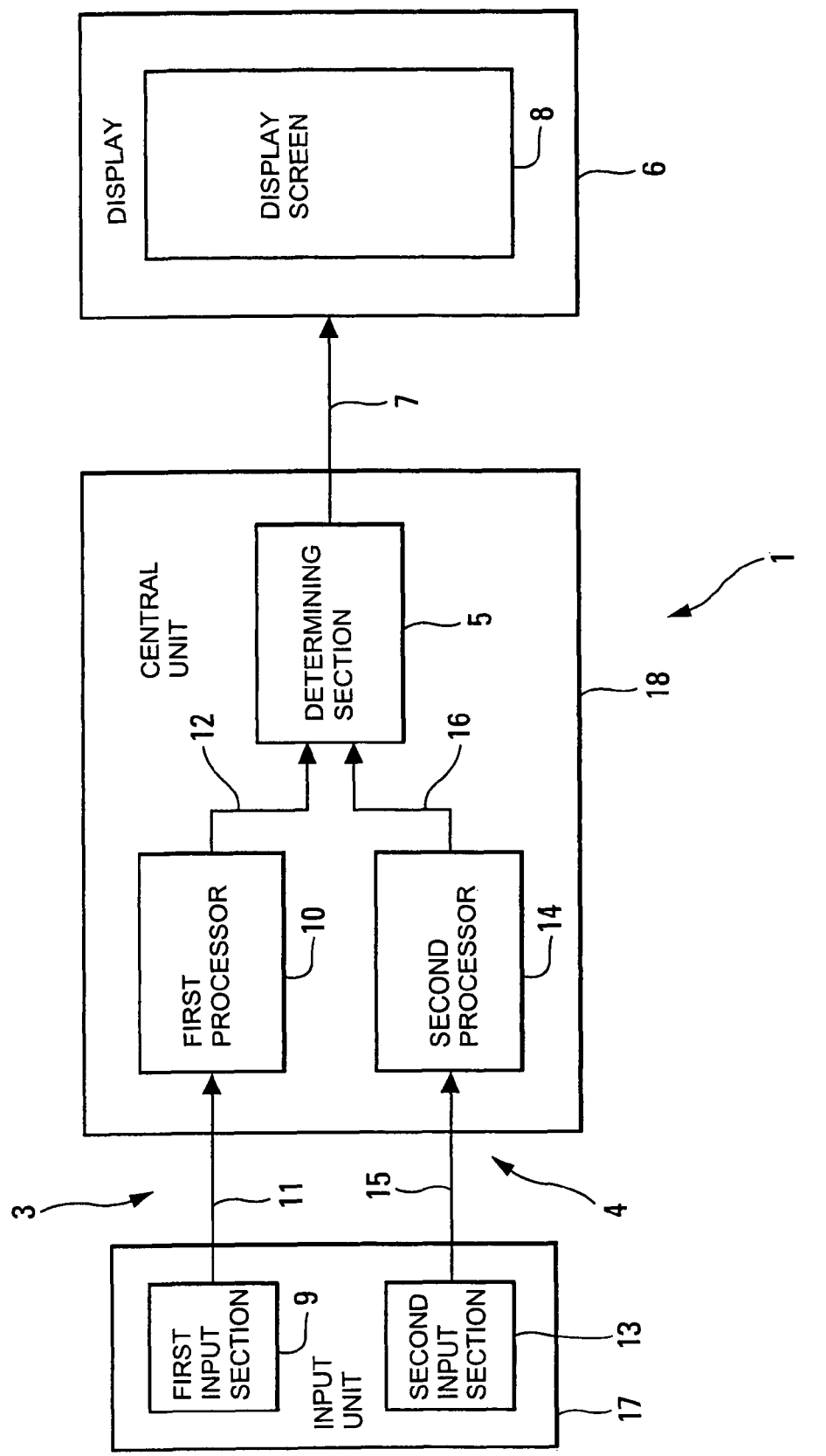
FIG. 1 is the block diagram of a device according to the invention.
Figure 2:
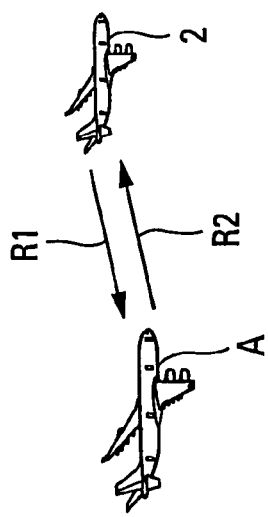
FIG. 2 diagrammatically shows a transfer of fuel between an aircraft and an auxiliary aircraft.

The device 1 according to the invention and diagrammatically represented in FIG. 1 is intended to optimize the quantity (mass, volume, etc.) of fuel transferred to an aircraft A on at least one in-flight transfer of fuel between said aircraft A and an auxiliary aircraft 2. As illustrated by the arrows R1 and R2 in FIG. 2, and specified below, in the context of the present invention, said transfer can be made in one direction (arrow R1) or in the other direction (arrow R2) depending on whether the aircraft A is a refueled aircraft (arrow R1) or a refueling aircraft (arrow R2).

According to the invention, said device 1 which is on board the aircraft A, comprises:

a means 3 specified below, for making a prediction to determine a first FOB (Fuel On Board) quantity corresponding to the quantity of fuel available (or remaining) on board the aircraft at a first flight point P1 in the flight plan PV of the aircraft A at which a transfer of fuel will be made, taking into account the current status (mass, altitude, speed, etc.) of the aircraft A and the current flying conditions (actual wind, temperature, etc.);

a means 4 specified below, for making an estimation to determine a second quantity Qi corresponding to the quantity of fuel enabling the aircraft A to fly from said first flight point P1 to a second flight point P2 later in said flight plan PV;

a means 5 for determining, based on said first and second quantities FOB and Qi, a third quantity Qf corresponding to the quantity of fuel to be transferred at said first flight point P1; and means of display 6 which are linked by a link 7 to said means 5, for presenting on a display screen 8 which is typically installed on the flight deck of the aircraft A, said quantity Qf, that is, the quantity of fuel to be transferred at said first flight point P1.

Said means 3 comprises:

input means 9 enabling an operator, for example a pilot of the aircraft A, to enter data concerning the aircraft A, its flight and/or its environment, as specified below; and a processing means 10 which is linked by links 11 and 12 respectively to said input means 9 and to said means 5 and which applies a prediction function to make said abovementioned prediction.

This prediction function, of a normal type, is based on current conditions of the aircraft A specified or entered by the crew, the geometry of the flight plan and the performance models taking into account the characteristics of the aircraft A (engines, aerodynamic characteristics, performance data). The performance models used for the predictions are generated from wind-tunnel models and are corrected after in-flight tests. They reflect the performance of the engines, the aerodynamic characteristics of the aircraft A and its own performance attainments. These models are stored in the form of performance tables, specific to each type of aircraft A. These tables are used to determine, based on input parameters such as the mass of the aircraft A, the altitude, etc., the parameters reflecting the performance attainments of said aircraft A, which are used to calculate the predictions.

Furthermore, said means 4 comprises:

input means 13 enabling an operator, for example a pilot of the aircraft A, to enter data specified below and similar to the data that might be entered via the input means 9; and a processing means 14 which is linked by links 15 and 16 respectively to said input means 13 and to said means 5 and which applies an estimation function to make said aforementioned estimation.

This estimation function is used to determine a quantity Q2 corresponding to the quantity of fuel remaining on board the aircraft A at said second flight point P2, based on a quantity Q1 corresponding to the quantity of fuel available on board the aircraft A at said first flight point P1, and it iteratively modifies said quantity Q1 until a quantity Q2 of fuel is obtained which is zero (after deducting the operational and regulatory margins of the aircraft A). The duly defined quantity Q1 (that is, the quantity that corresponds to a zero quantity Q2) represents said second quantity Qi sought by the means 4.

For this, the input means 13 are used by an operator to enter into the processing means 14, the following input data:
- the flight plan PV of the aircraft A;
- the cruising level of the aircraft A, that is, the altitude at which the aircraft A will complete the cruising phase [for example, an altitude of 30 000 feet (or approximately 10 000 meters) for a flight level "FL 300"];
- the mass and the trim without fuel of the aircraft A; and
- an optimization criterion.

Said optimization criterion defines a ratio (selected by the crew) between the fuel consumption of the aircraft A and the corresponding flight time.

Consequently, the estimation function applied by the processing means 14 and which is already available before the take-off of the aircraft A, uses the abovementioned prediction of the quantity of fuel remaining on arrival. The aim is to load the quantity of fuel which, according to the predictions, will allow the aircraft to arrive at the destination, with a zero quantity of fuel remaining at the destination (after deducting operational and regulatory margins). As indicated previously, an iterative process is therefore used. To this end, an initial quantity Q1 is proposed. If the predictions give a remaining quantity Q2 on arrival that is positive, the initial quantity Q1 is reduced by a certain predetermined value. Otherwise, the initial quantity Q1 is increased by the same predetermined value. This operation is repeated until a satisfactory result is obtained. The result Qi is therefore the initial quantity of fuel Q1 used in the first iteration.

Moreover, according to the invention, said means 5 compares the FOB quantity received by the processing means 10 with the quantity Qi received by the processing means 14 and determines, based on this comparison, the quantity Qf which is presented to the crew by the display means 6, as specified below.

In a particular embodiment:
- the input means 9 and 13 used to enter the same input data are combined in one and the same input unit 17, for example of the computer keyboard or mouse type, which can be linked to a screen, in particular the display screen 8 of the display means 6; and/or
- said means 5, 10 and 14 are combined in a central unit 18, for example a flight management system of the aircraft A.

In a first embodiment, the aircraft A is a refueled aircraft, for example a refueled aeroplane, and the aircraft 2 is a normal refueling aircraft.

Figure 3:
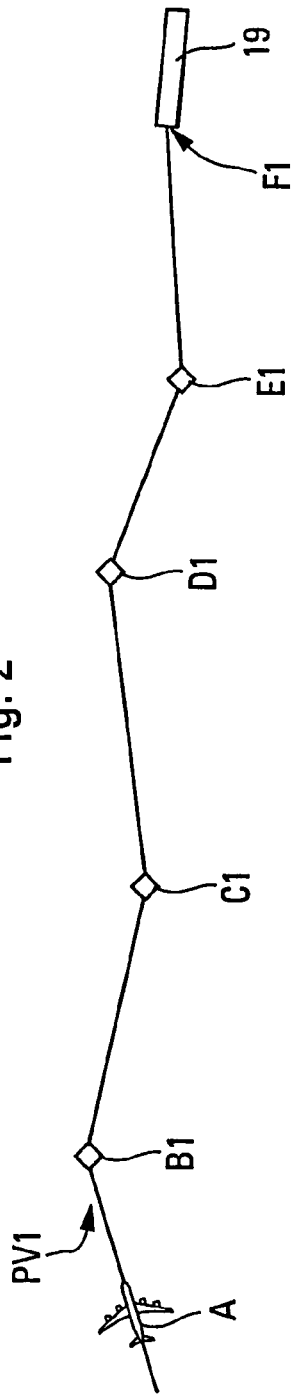
FIGS. 3 and 4 are graphics illustrating flight plans of an aircraft, for which different types of refueling are applied.

As represented in FIG. 3 corresponding to this first embodiment, the flight plan PV1 of the aircraft A comprises a plurality of check points (or flight points) B1, C1, D1, E1, F1, the last of which represent the destination, that is, the end of the runway 19 on which the aircraft A is to land.

When only one refueling is scheduled during the flight, for example at the flight point C1, the quantity Qf of fuel to be transferred at said flight point C1 from the refueling aircraft 2 to said refueled aircraft A, which is determined by the means 5 and which is presented on the display screen 8:
- is zero, if FOB≥Qi. In practice, in this case, the refueling is not needed. The aircraft A in practice has at said flight point C1 sufficient fuel (FOB) to reach its destination (flight point F1); and
- is equal to the difference between Qi and FOB (Qf=Qi−FOB), if FOB<Qi. This quantity Qi is necessary (and sufficient) to enable the aircraft A to reach its destination (flight point F1).

Naturally, the predictions can be updated in flight to adjust the FOB quantity, and therefore the quantity Qf, based on the current conditions encountered by the aircraft (between the departure and the current point where the Qf is calculated and presented, this being as far as said flight point C1).

In the case of multiple refuelings of said refueled aircraft A, for example at the flight points C1 and D1, the device 1 can be used to determine and display, firstly, the minimum quantity of fuel Qf(C1) (that is to say, the quantity necessary, but sufficient) that the aircraft A must receive at the flight point C1, where the first refueling is made, to reach the flight point D1, where the second refueling is made. It can also determine and display the minimum quantity of fuel Qf(D1) (that is to say, the quantity necessary, but sufficient) that the aircraft A must receive at said flight point D1 to reach the final destination F1.

To generalize, the device 1 can therefore be used to present to the crew the minimum quantity Qf of fuel that the aircraft A must receive (at each refueling point) to reach the next refueling point or, where appropriate, the final destination F1.

In a second embodiment, the aircraft A is a normal refueling aircraft (on which the fuel on board can be used for refueling or for the specific consumption of said refueling aircraft, the tanks for refueling and for own consumption not being separate) and the aircraft 2 is a refueled aircraft, for example a refueled aeroplane.

Figure 4:
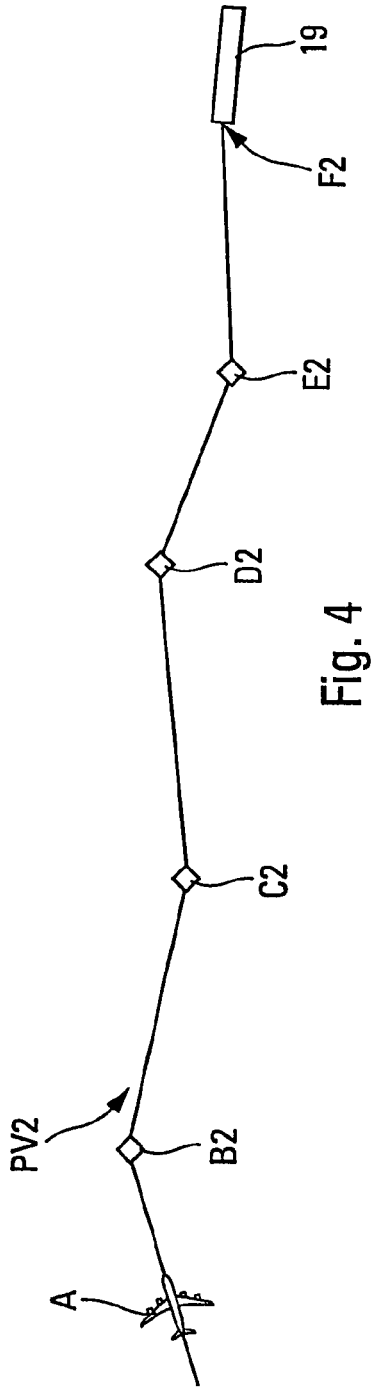

As represented in FIG. 4 corresponding to this second embodiment, the flight plan PV2 of the aircraft A comprises a plurality of check points (or flight points) B2, C2, D2, E2, F2, the last of which represents the destination, that is, the end of the runway 19.

When a single refueling is scheduled during the flight, for example at the flight point C2, the quantity Qf of fuel to be transferred at said flight point C2 from said refueling aircraft A to the refueled aircraft 2, which is determined by the means 5 and which is presented on the display screen 8:
- is zero, if FOB<Qi. In practice, in this case, the refueling is not compatible with the scheduled flight plan. The refueling aircraft A has in practice at said flight point C2 only an FOB quantity of fuel, that is, an insufficient quantity of fuel (a quantity Qi being necessary) to reach its destination (flight point F2); and
- is equal to the difference between Qi and FOB (Qf=FOB−Qi), if FOB≥Qi. The quantity Qi which still remains on board the aircraft A after the transfer is sufficient (and necessary) to enable the aircraft A to reach its destination (flight point F2).

Naturally, the predictions can be updated in-flight to adjust the FOB quantity, and therefore the quantity Qf, based on the current conditions encountered (between the departure of the aircraft A and the current point at which Qf is calculated and presented, and this as far as the flight point C2).

If it is assumed that two refuelings made by the refueling aircraft A are scheduled at C2 and D2, the maximum (necessary, but sufficient) quantity that the aircraft can deliver at C2 to reach the destination F2 can be indicated to the crew, simply by making an assumption regarding the quantity delivered at D2.

It is therefore possible to propose to the crew to restrict a refueling to a given value [for example, it may be planned to deliver the quantity Qf(D2) at D2] and optimize Qf(C2) at C2, taking into account the fixed quantity Qf(D2).

Failing any restriction at D2, a zero transfer at this point will be considered. In this case, the maximum deliverable quantity of fuel is presented at the flight point C2, retaining only what is needed to reach the destination F2.

To generalize, the maximum quantity deliverable at the first non-restricted refueling point is presented to the crew, disregarding the subsequent refueling points.

The device 1 according to the invention can therefore be used to indicate to the crew of an aircraft A participating in an in-flight refueling:

the maximum quantity of fuel Qf that it can deliver, while retaining enough fuel to finish the flight, in the case of a refueling aircraft A (FIG. 4); or the minimum quantity of fuel Qf that it must take on board, to complete its mission, in the case of a refueled aircraft A (FIG. 3).

Furthermore, this quantity of fuel Qf presented is optimized and updated, based on the flying conditions encountered by the aircraft A, up to the corresponding refueling point.

The invention claimed is:

1. A procedure to optimize a quantity of fuel transferred on an aircraft during at least one in-flight transfer of fuel between said aircraft and an auxiliary aircraft, at at least a first flight point of a flight plan of said aircraft, wherein, during the flight of the aircraft according to said flight plan, said procedure comprises:
    a) making a prediction to determine a first quantity corresponding to the quantity of fuel remaining on board the aircraft at said first flight point taking into account: (1) the current status of the aircraft, (2) the current flying conditions, (3) the geometry of said flight plan of said aircraft, and (4) performance models of said aircraft;
    b) making an estimation to determine a second quantity corresponding to the quantity of fuel enabling the aircraft to fly from said first flight point to a second flight point later in said flight plan;
    c) determining from said first and second quantities, a third quantity, corresponding to the quantity of fuel to be transferred at said first flight point; and
    d) presenting, by a display screen, said third quantity determined in step c), to at least one pilot of the aircraft,
    wherein:
    said sequence of successive steps a) to d) is performed repetitively during the flight of the aircraft, each time taking into account the current status of the aircraft and the current flying conditions in step a),
    the current status comprises said current speed, current mass, and current altitude of said aircraft,
    the current flying conditions comprise the wind and temperature, and
    to make said estimation of said second quantity in step b), an auxiliary prediction is made using a quantity Q1 corresponding to an estimate of the quantity of fuel available on board the aircraft at said first flight point and a quantity Q2 corresponding to an estimate of the quantity of fuel remaining on board the aircraft at said second flight point, wherein:
    the quantity Q1 is iteratively modified until the quantity Q2 equals a predetermined reserve quantity, and
    for each iteration, the quantity Q1 is modified by: (1) reducing a value of the quantity Q1 by a predetermined value when the quantity Q2 is more than the predetermined reserve quantity and (2) increasing the value of the quantity Q1 by the predetermined value when the quantity Q2 is less than the predetermined reserve quantity,
    wherein,
    said aircraft is a refueled aircraft and said auxiliary aircraft is a refueling aircraft, and
    in a plurality of fuel transfers, said steps a) to d) are applied to determine and to present, for each flight point at which a transfer is made, the minimum quantity of fuel that the aircraft must receive to reach the next flight point at which a transfer is also made or, where appropriate, the destination.

2. The procedure as claimed in claim 1, wherein, in step c), said first and second quantities are compared, and wherein said third quantity is determined, corresponding to the quantity of fuel to be transferred at said first flight point, according to this comparison, such that: said third quantity is zero when said first quantity is greater than or equal to said second quantity; and said third quantity is equal to the difference between said second quantity and said first quantity when said first quantity is less than said second quantity, said third quantity then corresponding to the minimum quantity of fuel needing to be received on board the aircraft at said first flight point for the aircraft to be able to reach said second flight point.

3. A procedure to optimize a quantity of fuel transferred on an aircraft during at least one in-flight transfer of fuel between said aircraft and an auxiliary aircraft, at at least a first flight point of a flight plan of said aircraft, wherein, during the flight of the aircraft according to said flight plan, said procedure comprises:
    a) making a prediction to determine a first quantity corresponding to the quantity of fuel remaining on board the aircraft at said first flight point taking into account: (1) the current status of the aircraft, (2) the current flying conditions, (3) the geometry of said flight plan of said aircraft, and (4) performance models of said aircraft,
    b) making an estimation to determine a second quantity corresponding to the quantity of fuel enabling the aircraft to fly from said first flight point to a second flight point later in said flight plan;
    c) determining from said first and second quantities, a third quantity, corresponding to the quantity of fuel to be transferred at said first flight point; and
    d) presenting, by a display screen, said third quantity determined in step c), to at least one pilot of the aircraft,
    wherein:
    said sequence of successive steps a) to d) is performed repetitively during the flight of the aircraft, each time taking into account the current status of the aircraft and the current flying conditions in step a),
    the current status comprises said current speed, current mass, and current altitude of said aircraft,
    the current flying conditions comprise the wind and temperature, and
    to make said estimation of said second quantity in step b), an auxiliary prediction is made using a quantity Q1 corresponding to an estimate of the quantity of fuel available on board the aircraft at said first flight point and a quantity Q2 corresponding to an estimate of the quantity of fuel remaining on board the aircraft at said second flight point, wherein:
    the quantity Q1 is iteratively modified until the quantity Q2 equals a predetermined reserve quantity, and
    for each iteration, the quantity Q1 is modified by: (1) reducing a value of the quantity Q1 by a predetermined value when the quantity Q2 is more than the predetermined reserve quantity and (2) increasing the value of the quantity Q1 by the predetermined value when the quantity Q2 is less than the predetermined reserve quantity,
    wherein:
    the performance models used for the predictions are generated from wind-tunnel models and are corrected after in-flight tests, the performance models reflect the performance of the engines and the aerodynamic characteristics of the aircraft and its performance attainments, the performance models are stored in the form of performance tables, the performance tables are used to determine, based on input parameters including the mass of the aircraft, and the altitude of the aircraft, parameters reflecting performance attainments of the aircraft, wherein the parameters are used to calculate the prediction used to determine the first quantity.

4. The procedure as claimed in claim 3, wherein said second flight point represents the destination off the aircraft.

5. The procedure as claimed in claim 3, wherein said second flight point represents any flight point between said first flight point, at which a transfer is made, and a final flight point in the flight plan.

6. The procedure as claimed in claim 3, wherein in step b) the estimation is based on an optimization criterion which represents the ratio between said aircraft's fuel consumption and said aircraft's flight time.

7. The procedure as claimed in claim 3, wherein in step b) the estimation is based on an optimization criterion which represents the ratio between said refueling aircraft's fuel consumption and said refueling aircraft's flight time.

* * * * *